United States Patent
Seo et al.

(10) Patent No.: US 8,982,765 B2
(45) Date of Patent: Mar. 17, 2015

(54) METHOD AND APPARATUS FOR TRANSMITTING DATA ON RELAY COMMUNICATION SYSTEM

(75) Inventors: Han-Byul Seo, Anyang (KR); Byoung-Hoon Kim, Anyang (KR)

(73) Assignee: LG Electronics Inc., Seoul (KR)

( * ) Notice: Subject to any disclaimer, the term of this patent is extended or adjusted under 35 U.S.C. 154(b) by 161 days.

(21) Appl. No.: 13/257,250

(22) PCT Filed: Mar. 11, 2010

(86) PCT No.: PCT/KR2010/001528
§ 371 (c)(1),
(2), (4) Date: Sep. 16, 2011

(87) PCT Pub. No.: WO2010/107207
PCT Pub. Date: Sep. 23, 2010

(65) Prior Publication Data
US 2012/0002598 A1   Jan. 5, 2012

Related U.S. Application Data

(60) Provisional application No. 61/161,053, filed on Mar. 17, 2009.

(51) Int. Cl.
*H04B 7/14*   (2006.01)
*H04B 7/26*   (2006.01)

(52) U.S. Cl.
CPC ................................. *H04B 7/2606* (2013.01)
USPC ........ 370/315; 455/421; 455/422.1; 455/436; 455/443; 455/450

(58) Field of Classification Search
CPC .............................. H04B 7/2606; H04W 88/04
USPC ......... 370/279–282, 293, 310, 315–316, 322, 370/328–330, 341–345, 348, 441–442, 370/458; 455/421, 422.1, 436, 443, 456.1
See application file for complete search history.

(56) References Cited

U.S. PATENT DOCUMENTS

2007/0002724 A1*   1/2007   Khan ........................... 370/203
2007/0110005 A1*   5/2007   Jin et al. ....................... 370/335
(Continued)

FOREIGN PATENT DOCUMENTS

KR   10-2007-0034408 A     3/2007
WO   WO/2008/049843   *   5/2008   ............... H04B 7/26

OTHER PUBLICATIONS

3GPP TSG-RAN WG1 #55, R1-084400, "Coordinated Multi-Point downlink transmission in LTE-Advanced", Qualcomm Europe, Agenda item 11, pp. 1-5, Nov. 10-15, 2008.
(Continued)

*Primary Examiner* — Andrew Chriss
*Assistant Examiner* — Peter Mak
(74) *Attorney, Agent, or Firm* — Birch, Stewart, Kolasch & Birch, LLP

(57) ABSTRACT

A data transmission method and apparatus using a multi-point cooperative transmission for a backhaul link transmission of a relay communication system. A data transmission method of a base station in a radio relay communication system include: obtaining, by a first BS, first radio resource information scheduled by a neighbor BS with respect to a first relay node (RN) located within the coverage of the first BS; when the first BS has data to be transmitted to the first RN, scheduling the data of the first BS on first radio resource allocated by the neighbor BS; and transmitting, by the first BS, the data of the first BS on the first BS, wherein the first RN is located within an overlapping cell coverage between the first BS and the neighbor BS. Thus, backhaul link transmission efficiency between the BS and the RN in the relay communication system can be improved and an inter-cell interference with respect to a backhaul link can be reduced.

4 Claims, 14 Drawing Sheets

(56) References Cited

U.S. PATENT DOCUMENTS

| | | | |
|---|---|---|---|
| 2008/0194267 A1* | 8/2008 | Ahn et al. | 455/450 |
| 2009/0047971 A1* | 2/2009 | Fu | 455/450 |
| 2009/0181708 A1* | 7/2009 | Kim et al. | 455/501 |
| 2010/0246475 A1* | 9/2010 | Naden et al. | 370/315 |

OTHER PUBLICATIONS

3GPP TSG-RAN1 #54, R1-083115, "Discussion on DL coordinated multipoint transmission", Fujitsu, Agenda item 12, pp. 1-7, Aug. 8-22, 2008.

* cited by examiner

METHOD AND APPARATUS FOR TRANSMITTING DATA ON RELAY COMMUNICATION SYSTEM

This application is the National Phase of PCT/KR2010/001528 filed on Mar. 11, 2010, which claims priority under 35 U.S.C. 119(e) to U.S. Provisional Application No. 61/161,053 filed on Mar. 17, 2009, all of which are hereby expressly incorporated by reference into the present application.

1. FIELD OF THE INVENTION

The present invention relates to a method and apparatus for transmitting data in a communication system and, more particularly, to a method and apparatus for transmitting data in a relay communication system.

2. DESCRIPTION OF THE RELATED ART

In a wireless communication system, recently, a service frequency band is gradually raised and a cell radius is gradually reduced in order to smoothly support high speed data communication and accommodate greater traffic, so the operation of an existing centralized cellular wireless network scheme involves much problem. Namely, in the related art method in which the location of a base station (BS) is fixed, flexibility of configuration of a radio link deteriorates, failing to provide an effective communication service in a wireless environment in which a traffic distribution or traffic demand (or call volume) are severely changed.

Thus, in order to solve the problem, a next-generation wireless communication system called an LTE-Advanced (Long Term Evolution Advanced) system or an E-UTRA (Evolved Universal Terrestrial Radio Access) system considers a relay, specifically, a multi-hop relay. A relay communication system has advantages in that it can expand a cell service by covering a local shadow area existing in a cell area, increase a system capacity such as data throughput, or the like, and reduce a burden of equipment installation costs.

In the relay communication system, a communication channel between a base station (BS) and a terminal (or a user equipment (UE)) may be established through a direct connection between the BS and the UE or may be established through a relay node (RN). The RN receives data from the BS and transfers it to UEs, receives data from the UEs, and transfer the received data to the BS. The BS connected to the RN is called a doner eNB.

Here, the communication channel established between the BS and the relay node is called a backhaul link. An in-band backhaul scheme is a scheme of dynamically sharing frequency resources between the backhaul communication and UE communication, and out-band backhaul refers to a scheme of performing backhaul communication by using frequency resources which are different from those of UE communication.

Meanwhile, the relay node is generally disposed at a cell boundary. This is because, when UEs located at the cell boundary are directly connected to the BS, quality of communication channels between the UEs and the BS is poor. However, since the relay node is disposed at the cell boundary to support the UEs located at the cell boundary, severe inter-cell interference (ICI) occurs at the backhaul link between the relay node and the BS, resulting in a degradation of backhaul link channel quality. ICI refers to interference generated between cells using the same center frequency, and it may cause a big problem in an OFDM (orthogonal frequency division multiplexing) cellular system whose frequency reuse factor is 1.

SUMMARY OF THE INVENTION

An aspect of the present invention provides a data transmission method and apparatus capable of improving a backhaul link transmission efficiency between a base station (BS) and a relay node (RN) in a relay communication system and reducing inter-cell interference (ICI) with a backhaul link.

According to an aspect of the present invention, there is provided a data transmission method of a BS in a radio relay communication system, including: obtaining, by a first BS, first radio resource information scheduled by a neighbor BS with respect to a first relay node (RN) located within the coverage of the first BS; when the first BS has data to be transmitted to the first RN, scheduling the data of the first BS on first radio resource allocated by the neighbor BS; and transmitting, by the first BS, the data of the first BS on the first BS, wherein the first RN is located within an overlapping cell coverage between the first BS and the neighbor BS.

The radio resource is resource blocks, and the resource blocks may be divided into a subframe and a frequency band.

When data of the neighbor BS is transmitted on a first subframe and a first frequency band, data of the first BS may be transmitted on the first subframe and a second frequency band.

When the data of the neighbor BS is transmitted on the first subframe and the first frequency band, data of the first BS may be transmitted on a second first subframe and the first frequency band.

The method may further include: when the first BS has data to be transmitted to a second RN or macro UE, scheduling, by the first BS, the data of the first BS on second radio resource which has not been allocated by the neighbor BS; and transmitting, by the first BS, the data, on the second radio resource.

The method may further include: when the first BS has data to be transmitted to a second RN or macro UE, scheduling, by the first BS, the data of the first BS on first radio resource which has been allocated by the neighbor BS; and transmitting, by the first BS, the data, on the first radio resource.

The method may further include: receiving, by the first BS, information regarding inter-cell interference (ICI) generated as the first BS transmits data to the second RN or the macro UE, from the first RN; and adjusting a setting of data transmission to the second RN or the macro UE such that ICI with respect to the first RN is minimized based on the received information regarding the ICI.

The data transmitted by the first BS to the first RN and the data transmitted by the neighbor BS to the first RN may not have a common part.

The data transmitted by the first BS to the first RN and the data transmitted by the neighbor BS to the first RN may be data toward different UEs, respectively.

According to another aspect of the present invention, there is provided a data transmission method of a relay node (RN) in a radio relay communication system, including: obtaining, by the RN, information regarding radio resource scheduled by a first base station (BS) with respect to the RN; receiving, by the RN, data of the first BS on the radio resource; and receiving, by the RN, data of a second BS on the radio resource, wherein the RN may be located within an overlapping cell coverage between the first and second BSs.

The method may further include: obtaining, by the RN, information regarding radio resource scheduled by the second BS with respect to the RN.

When the data of the second BS is transmitted on a first subframe and a first frequency band, the data of the first BS may be transmitted on the first subframe and a second frequency band.

When the data of the second BS is transmitted on the first subframe and the first frequency band, the data of the first BS may be transmitted on the second subframe and the first frequency band.

The data transmitted by the first BS to the RN and the data transmitted by the second BS to the RN may be data toward different UEs, respectively.

According to another aspect of the present invention, there is provided a data transmission apparatus in a radio relay communication system, including: a controller configured to schedule data, to be transmitted to a relay node (RN), on radio resource allocated by a neighbor data transmission apparatus when the data is to be transmitted to the RN; and a transceiver configured to obtain information regarding radio resource scheduled by the neighbor data transmission apparatus with respect to the RN, and transmit the data on the radio resource, wherein the RN is located within an overlapping cell coverage between the data transmission apparatus and the neighbor data transmission apparatus.

According to the data transmission method and apparatus in a relay communication system as described above, a backhaul link transmission efficiency between the BS and the RN can be improved and ICI with respect to the backhaul link can be reduced in the relay communication system.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
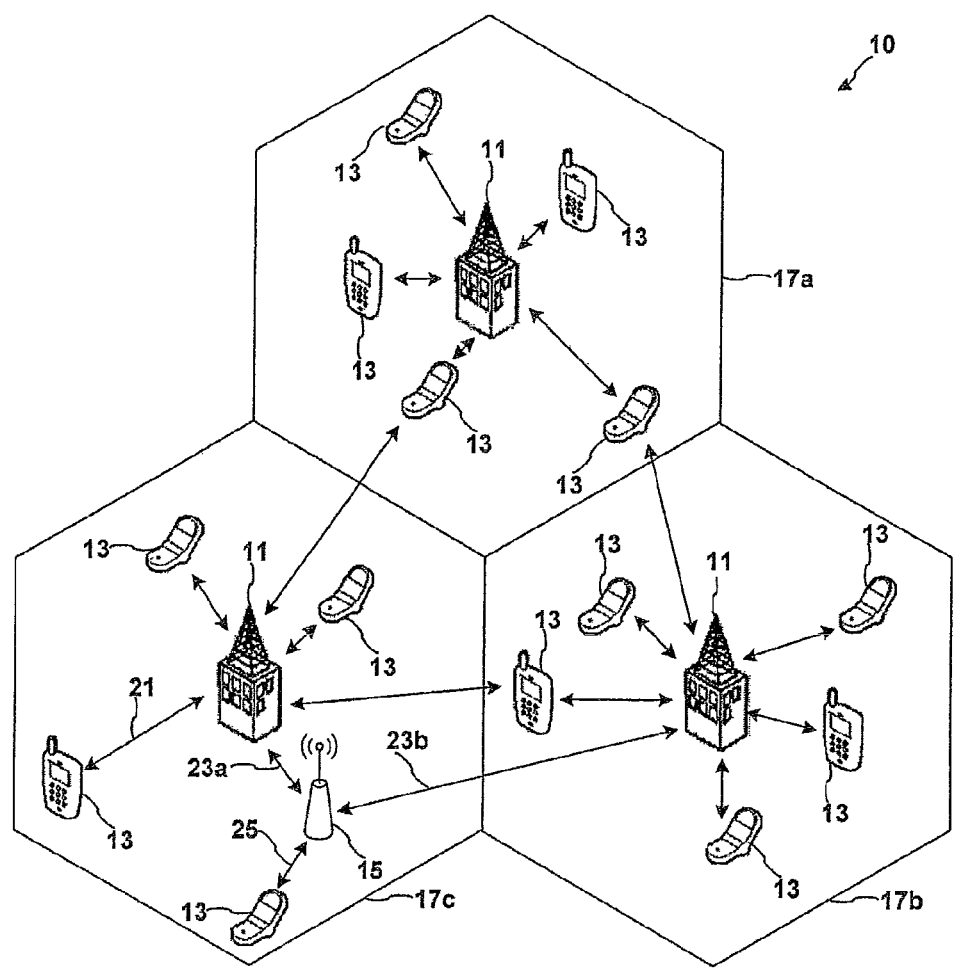
FIG. 1 is a conceptual view explaining a relay type wireless communication system to which the present invention is applied.

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. It could be understood that the accompanying drawings are presented to help understand the present invention more clearly and the technical concept of the present invention is not limited by the accompanying drawings.

Terms required for explaining embodiments of the present invention will be described.

Communication System

A communication system according to an embodiment of the present invention is a multiple access system providing communication with multiple users by sharing radio resources such as a frequency band, or the like. A multiple access scheme applied to the communication system according to an embodiment of the present invention includes every multiple access scheme such as TDMA (time division multiple access), FDMA (frequency division multiple access), CDMA (code division multiple access), OFDMA (orthogonal frequency division multiple access), SC-FDMA (single carrier frequency division multiple access), or any other known modulation techniques. Also, multiple access schemes for downlink transmission and uplink transmission may be different, and downlink may use the OFDMA while uplink may use SC-FDMA.

The communication system according to an embodiment of the present invention is a system for providing various communication services such as voice, packet data, or the like, which includes a base station and a UE. For example, the communication system according to an embodiment of the present invention may be a 3GPP (3rd Generation Partnership Project) LTE (Long Term Evolution) system, a 3GPP LTE-Advanced system, or the like. A communication system hereinafter is not limited to a particular system, and in order to clarify the present invention, a 3GPP LTE system will be described as an example.

Terminal

A terminal in the present document may also be called by other names such as SS (subscriber station), UE (user equipment), ME (mobile equipment), MS (mobile station), and may include portable devices having a communication function such as a mobile phone, a PDA, a smart phone, a notebook computer, or the like, and non-portable devices such as a PC, a vehicle-mount device, or the like.

Base Station

A base station according to the present document refers to a fixed point communicating with a UE and may be called by other names such as eNB (evolved-NodeB), NB (NodeB), BTS (base transceiver system), access point, or the like. One BS provides a communication service to at least one cell, and an interface for user traffic transmission or control traffic transmission may be used between BSs.

Relay Node

A relay node (RN) according to the present document may be called by other names such as relay, repeat station, repeater, relay station, or the like. The RN is installed between a BS and a UE to relay transmission and reception signals to serve to cover a partial shadow area generated in a cell area, expand a cell service area, and increase system capacity. The RN may be configured multiple hops to effectively relay data traffic generated between the BS and the UE, and may be fixed to a position so as to be operated, or may have mobility.

Downlink, Uplink

Downlink refers to a communication channel from a BS to a UE, and uplink refers to a communication channel from a UE to a BS. In downlink, a transmitter may be part of a BS and a receiver may be part of a UE. In uplink, a transmitter may be part of a UE and a receiver may be part of a BS.

Multi-Point Transmission, Cooperative Transmission

In general, multi-point transmission refers to a multiple input multiple output (MIMO) transmission operation between two or more points and one or more UEs. Here, the point may be a site, a cell, a sector, a BS, a relay node, or the like.

In general, cooperative transmission (or cooperative transmission and reception) refers to a communication method in which two or more cells or sectors participate in a signal transmission and reception with a single UE, and this method may also be called CoMP (coordinated multiple point, coordinated multiple point transmission reception), Distributed MIMO, Network MIMO, Co-MIMO (collaborative MIMO, cooperative MIMO), or the like.

In general, cooperative transmission is understood to be a field of multi-point transmission, but occasionally, they are mixedly used. As described above, multi-point transmission or cooperative transmission refers to a signal transmission and reception between two or more points and a UE, and in an embodiment of the present invention, the concept of multi-point transmission or cooperative transmission is used to include even a signal transmission and reception between two or more points and a relay node. For example, a multi-point transmission or a cooperative transmission may be made in the signal transmission and reception between two or more BSs and one relay node. Namely, this means that backhaul communication is performed according to multi-point transmission or cooperative transmission technique.

Types of Cooperative Transmission Techniques

Cooperative transmission, which can be used to change an inter-cell interference (ICI) signal into a desired signal or restrain inter-cell interference (ICI) with respect to a UE at a cell boundary, may be a desirous solution to inter-cell interference (ICI) mitigation. The cooperative transmission technique is discussed as a major technique in the 3GPP LTE-Advanced system. In particular, in 3GPP TR 36.814 V1.5.0 (2009-11), cooperative transmission is called CoMP and classifies the cooperative transmission into a joint processing (JP) technique and a cooperative scheduling/beamforming (CS/CB).

The JP technique is a cooperative transmission technique in which cells or sectors jointly process a signal transmitted to a UE or a signal transmitted from the UE. Namely, all of points performing transmission to the UE have data. The JP technique includes a joint transmission technique in which a PDSCH (Physical Downlink Shared Channel) is transmitted from multiple points to a single UE, and a dynamic cell selection technique in which the PDSCH is transmitted to a single UE from one point at a point. For example, in the JP technique, cells may transmit the same data to a single cell.

The CS/CB technique is a cooperative transmission method in which each cell or each sector processes its own signal based on control information (e.g., scheduling information) shared between cells or sectors. In this technique, only a serving point (e.g., a serving cell) may have (or retain) data toward a UE, and user scheduling or beamforming determination may be made between points (e.g., cells) through negotiation. A cooperative silencing technique belongs to the CS/CB technique.

In performing CoMP, a cooperation level (or a collaboration level) between multiple points may vary depending on the extent or degree of the data or channel status information (CSI) shared between multiple points. The degree of sharing information between multiple points participating in the cooperative transmission should be determined in consideration of an appropriate compromise or trade-off between performance and control overhead.

Resource, Segment

Resource, i.e., radio communication resource, may be defined as at least one resource block which can be allocated on a time domain (time axis) and a frequency domain (frequency axis), and the at least one resource block may be called a segment, or the like. A segment may be understood as a frequency band, a frame, a subframe, a slot, or a portion of the subframe, or the like.

Hereinafter, embodiments of a data transmission method and apparatus capable of improving backhaul link transmission efficiency between a BS and an RN by using a cooperative transmission of multiple points in a relay communication system will now be described in detail with reference to FIGS. 1 to 14.

Various cooperative transmission techniques such as the multi-cell cooperative transmission, the multi-sector cooperative transmission, or the like, have been studied, but most of them relate merely to an access link between a BS and a UE, rather than a backhaul link between a BS and an RN. Also, since the backhaul link is greatly different from an access link in terms of its characteristics and channel structure, so an effective cooperative transmission method in consideration of the differential aspect is required.

A data transmission method according to an embodiment of the present invention aims at improving backhaul link transmission efficiency between a BS and an RN by using a cooperative transmission of multiple points (e.g., multiple cells or multiple sectors) and mitigating inter-cell interference (ICI) with respect to a backhaul link in a relay communication system. Also, in the data transmission method according to an embodiment of the present invention, an RN is connected to a plurality of BSs or a plurality of sectors so as to adaptively operate according to a fading channel and frequency selectivity of multiple transmission and reception antennas.

Hereinafter, it is assumed that a BS is an example of a point, and a cooperative between two BSs and one RN will be described as an example for the sake of brevity. Here, however, the system configuration including two BSs and one RN is merely illustrative and the technical concept of the present invention is not limited thereto. For example, the present invention may be applicable to a case in which the RN is connected to two or more BSs or connected to a plurality of sectors managed by a BS.

Also, hereinafter, it is assumed that resource scheduling is performed based on frequency division multiplexing (FDM). However, FDM is taken as an example to explain an embodiment of the present invention and, the resource scheduling may be performed based on time division multiplexing (TDM) in a similar manner, and the technical concept of the present invention is not limited thereto.

FIG. 1 is a conceptual view explaining a relay type wireless communication system to which the present invention is applied.

As shown in FIG. 1, a wireless communication system 10 includes at least one BS 11. Each BS 11 provides a communication service to one or more cells 17a, 17b, and 17c. Each of the cells 17a, 17b, and 17c may be divided into a plurality of sectors (not shown). A UE 13 may communicate with at least one BS 11.

In establishing a communication channel with the UE 13, the BS 11 may establish a channel through a direct link 21 or establish a channel a the UE 13 through links 23a and 25 by way of an RN 15. Here, the channel 23a established between the BS 11 and the RN 15 is called a backhaul link, and a data transmission on the backhaul link between the BS 11 and the RN 15 is called a backhaul transmission or backhauling. For example, in the 3GPP LTE system, the backhaul link 23a may include an R-PDSCH (Relay Physical Downlink Shared Channel) via which data is transmitted, and an R-PDCCH (Relay Physical Downlink Control Channel) via which control information is transmitted.

The RN 15 may establish form backhaul links 23a and 23b with two or more BSs 11. In this case, the RN 15 may receive the same data at the same point in time or at different points in time from the plurality of BSs 11 by using cooperative transmission, or may receive different data at the same point in time or at different points in time from the plurality of BSs 11.

Or, the RN 15 may receive the same data in the same frequency band or in different frequency bands from the plurality of BSs 11 by using cooperative transmission, or may receive different data in the same frequency band or different frequency bands.

In particular, when the RN 15 receives the same data from two or more BSs 11, a signal gain according to source diversity can be obtained, and when different data are received from two or more BSs 11, information transmission capabilities can be enhanced according to MIMO spatial multiplexing (MIMO SM). Here, when the two or more BSs 11 are far away from each other, the foregoing diversity gain and spatial multiplexing characteristics can be further improved.

Meanwhile, the BS 11 and the RN 15 may use an interconnection interface at the level of BS versus BS at an initial setting process in which they are connected to each other. For example, the BS 11 and the RN 15 may be interconnected according to an X2 interface. Or, the BS 11 and the RN 15 may use an interconnection interface at the level of BS versus UE at the initial setting process in which they are interconnected. For example, the BS may recognize the RN 15 as a UE and may be connected with the RN 15 through the same procedure as or similar procedure to that used for a connection with a UE.

Figure 2:
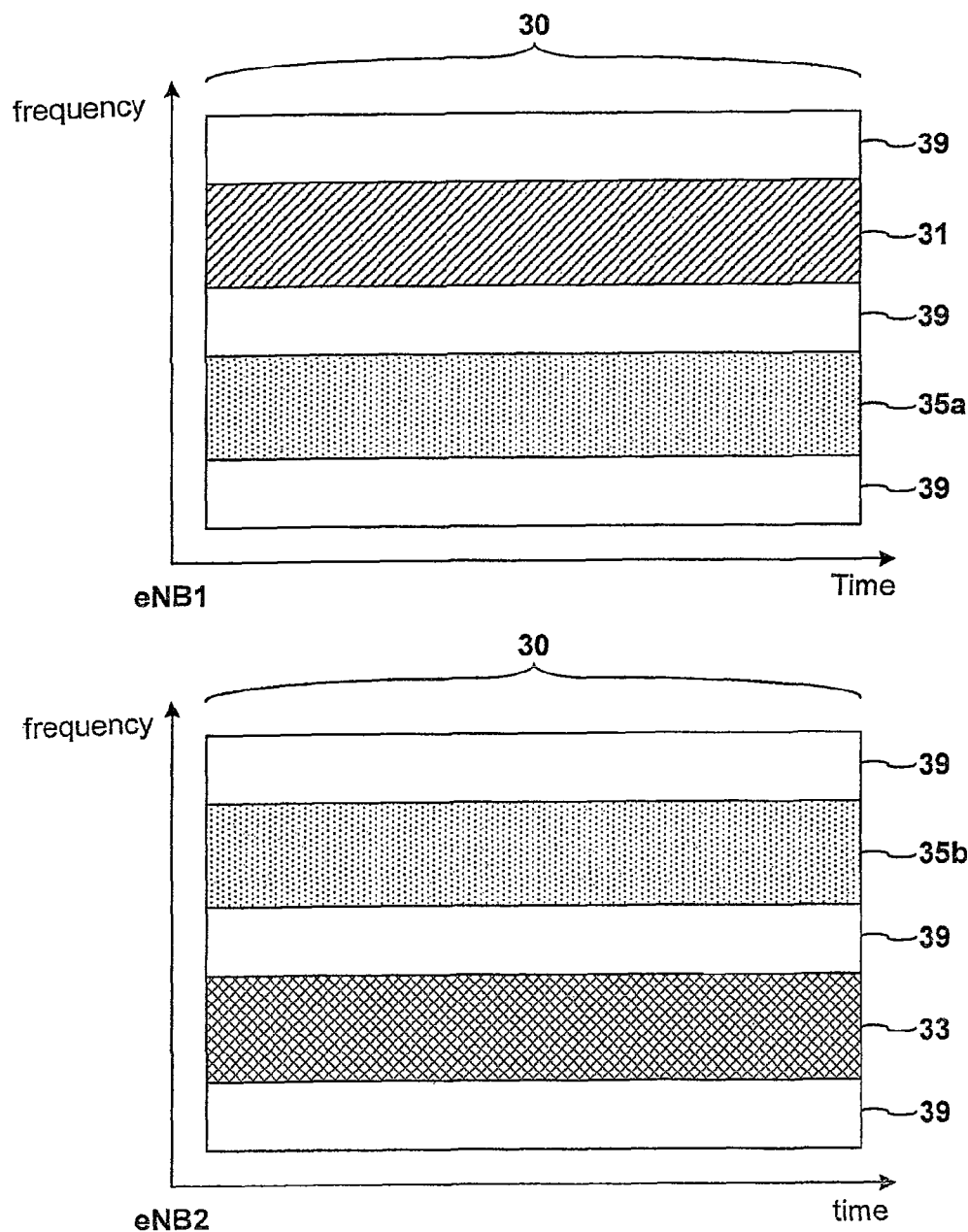
FIG. 2 is a conceptual view showing the structure of a subframe used in a data transmission method in the relay communication system according to an embodiment of the present invention.

FIG. 2 is a conceptual view showing the structure of a subframe used in a data transmission method in the relay communication system according to an embodiment of the present invention.

In a subframe 30 allocated for downlink backhaul from a BS to an RN, two BSs eNB1 and eNB2 transmit backhaul data to the RN by using a resource block (RB) separate in a frequency band. To this end, for example, the two BSs eNB1 and eNB2 may share information regarding the configuration of the subframe, the allocation of the frequency band, the allocation of the resource block (segment), or the like, through an X2 interface, or the like, and such allocation of the resource block, or the like, may be determined by negotiation (협의) between the two BSs eNB1 and eNB2.

As shown in FIG. 2, the entire resource block allocated for the backhaul data transmission to the RN may be divided into two segments 31 and 33 which do not overlap in a frequency band. Namely, the BS eNB1 may transmit backhaul data to the RN by using the segment 31, and the BS eNB2 may transmit backhaul data to the RN by using the segment 33.

Here, the two BSs eNB1 and eNB2 may adjust the subframe configuration, the frequency band allocation, the resource block allocation, or the like, in consideration of a communication channel status with the RN (i.e., a channel status between the BS eNB1 and the RN and a channel status between the BS eNB2 and the RN), various other communication environment factors, and the like. For example, when the channel status between the BS eNB1 and the RN is good in the segment 33 and the channel status between the BS eNB2 and the RN is good in the segment 31, unlike the illustration of FIG. 2, conversely, the BS eNB1 may use the segment 33 and the BS eNB2 may use the segment 31. Of course, a resource block may be allocated in a different band, rather than the segment 31 or the segment 31.

Meanwhile, the BS eNB1 and the eNB2 may transfer different data streams to the RN through the segments 31 and 33 selected for a backhaul link transmission, respectively. This means that backhaul data is not shared between the BS eNB1 and the BS eNB2, and at the UE's position, the UE sufficiently receives all the data due to be received. Thus, the information regarding the resource block allocation, the data to be transmitted to the RN, or the like, may be shared between the BS eNB1 and the BS eNB2, but the connections between the respective BS eNB1 and the BS eNB2 are at least partially independent mutually, and, for example, different modulation and coding schemes (MCS) may be used in consideration of a channel status.

Meanwhile, in order for the RN to receive every backhaul data to be transmitted to UEs, each BS may not transmit a signal in a segment in which a different BS transmits a backhaul signal to the RN. Namely, the BS eNB1 may not transmit a signal in the segment 35a corresponding to the frequency band or the resource block of the segment 33 used by the BS eNB2 to transmit the backhaul data, and conversely, the BS eNB2 may not transmit a signal in the segment 35b corresponding to the frequency band or the resource block of the segment 31 used by the BS eNB1 to transmit the backhaul data. Thus, a data loss due to interference generated when the same frequency band or the same resource block is used to transmit a signal can be prevented.

Meanwhile, the respective BS eNB1 and BS eNB2 may transmit data to a different RN or macro UEs thereof, by using a frequency band or a resource block 39, which are not used by both of the two BS eNB1 and BS eNB2.

Meanwhile, for transmission/reception switching of the RN, if necessary, an appropriate guard interval (or a guard period) may be set between the segments 31, 33, 35a, 35b, and 39. To this end, information regarding setting of the guard interval may be shared between the BS eNB1 and the BS eNB2.

The data transmission method in the relay communication system according to an embodiment of the present invention as described above is advantageous in that a fast cell selection effect can be obtained in using frequency selectivity. This will be described as follows.

Backhaul link data in which data toward a plurality of UEs are integrated is anticipated to occupy more resource blocks than that of access link data transmitted to an individual UE, so, in actuality, it is impossible to receive resource blocks, having a good channel status while accommodating the entire backhaul data, allocated from a single BS.

In such a case, in the foregoing data transmission method in the relay communication system according to an embodiment of the present invention, backhaul data may be segmented so as to be transmitted from a plurality of BSs to the RN and respective resource blocks may be allocated to a segment having is the best channel quality as possible with respect to the respective BSs participating the cooperative transmission, thereby improving the backhaul data transmission efficiency. Namely, when a certain resource block has a good channel status with respect to a BS, the resource block may be allocated to the segment used by the BS for a data transmission. Otherwise, the resource block may be allocated to a segment used by a different BS for a data transmission.

The foregoing data transmission method in the relay communication system according to an embodiment of the present invention is particularly suitable for a case in which the number of antennas of a BS and an RN is small.

Figure 3:
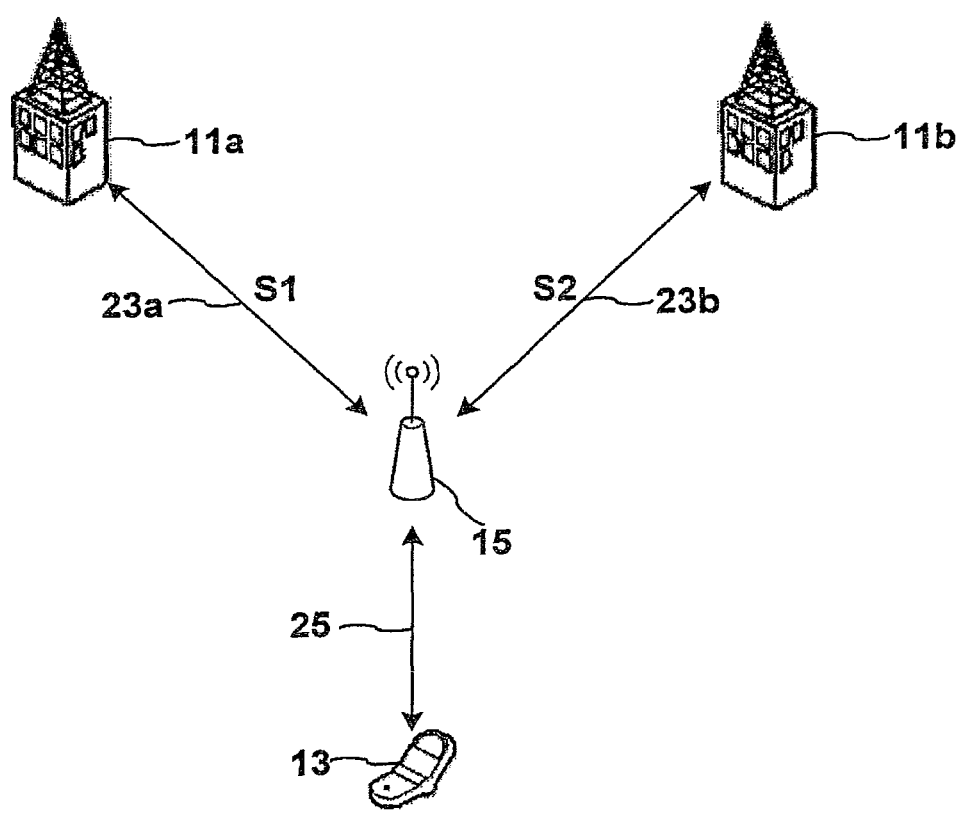
FIG. 3 is a conceptual view explaining the data transmission method in the relay communication system according to an embodiment of the present invention.

FIG. 3 is a conceptual view explaining the data transmission method in the relay communication system according to an embodiment of the present invention. Hereinafter, a segment may be called a frequency band or resource blocks.

As shown in FIG. 3, the backhaul link 23a between the BS 11a and the RN 15 is set to be segment 1, while the backhaul link 23b between the BS 11b and the RN 15 is set to be segment 2, so the transmission of backhaul data between the respective BSs 11a and 11b and the RN 15 is made on different segments. Te RN 15 receives backhaul data from the two BSs 11a and 11b, and transfers the received backhaul data to the UE 13 through an access line 25. As described above with reference to FIG. 2, it is not required for the BS 11a and the BS 11b to share the backhaul data.

Meanwhile, in order to transfer scheduling information required for detecting and decoding backhaul data signals transmitted from the two BSs 11a and 11b, two methods may be proposed. Here, the scheduling information may include an RN identifier (RN identification (RN ID)) used for each segment, the positions and number of allocated resource blocks, a modulation and coding scheme (MCS), a PMI (precoding matrix index, precoding matrix indicator), or the like.

Among the methods for transferring the scheduling information, a first method is that the respective BSs 11a and 11b transmit scheduling information with respect to the segments S1 and S2 used by them to the RN 15, respectively. A second method is that one BS (11a or 11b) transmits scheduling information with respect to all of the segments S1 and S2 to the RN. Like the second method, when only one BS (or cell) transmits the scheduling information, information such as a cell ID or a segment index may be additionally included in order to designate the segment to which the scheduling information corresponds.

Figure 4:
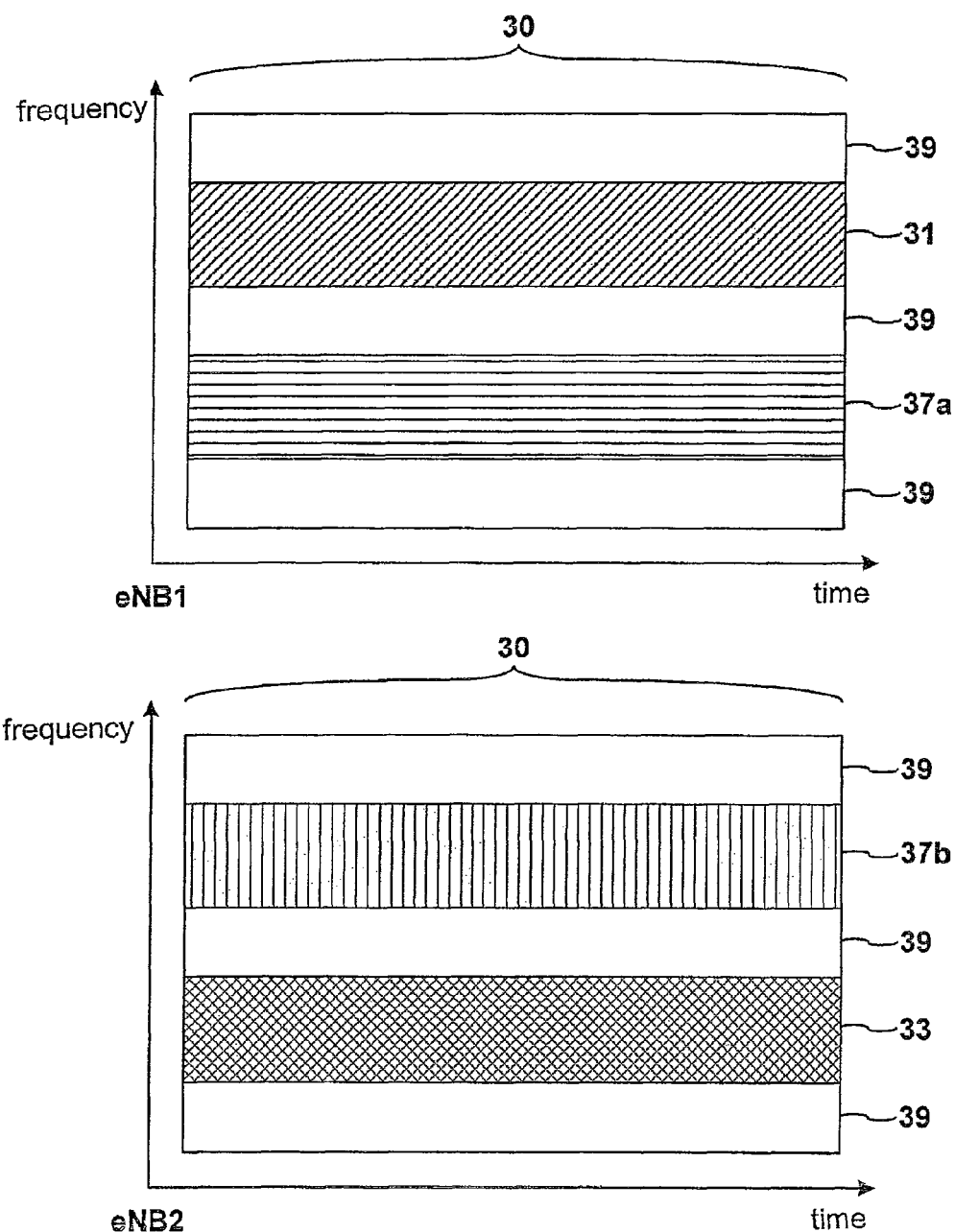
FIG. 4 is a conceptual view showing the structure of a subframe used in a data transmission method in the relay communication system according to another embodiment of the present invention.

FIG. 4 is a conceptual view showing the structure of a subframe used in a data transmission method in the relay communication system according to another embodiment of the present invention.

The embodiment of the present invention illustrated in FIG. 2 and the embodiment of the present invention illustrated in FIG. 4 are compared as follows. Namely, in the embodiment of the present invention illustrated in FIG. 2, the respective BSs does not transmit a signal in the segments 35a and 35b in which a different BS transmits backhaul data to the RN, while in the embodiment of the present invention illustrated in FIG. 4, the respective BSs may transmit a signal even in the segments 37a and 37b in which a different BS transmits backhaul data to the RN.

Namely, the embodiment of the present invention illustrated in FIG. 2 is different from the embodiment of the present invention illustrated in FIG. 4 in that, for example, the BS eNB1 does not transmit a signal in the segment 35a corresponding to the segment 33 used by the BS eNB2 for a backhaul ink, thereby fundamentally preventing mutual signal interference, while in the embodiment of the present invention illustrated in FIG. 4, for example, the BS eNB1 transmits a signal to a different RN or a macro UE connected thereto in the segment 37a corresponding to the segment 33 used by the BS eNB2 for the backhaul link.

As described above, in the embodiment of the present invention illustrated in FIG. 4, there is high possibility in which ICI is increased in that a plurality of BSs transmit signals in the same segment, but the ICI generated in the segment can be minimized by various ICI mitigation techniques.

In order to minimize ICI generated in a segment, an ICI coordination technique may be used. For example, an FFR (flexible frequency reuse) technique can reduced interference in a boundary area between adjacent cells by using a frequency reuse factor (FRF) 1 in a central area of a cell and using an FRF greater than 1 in a cell boundary area.

Or, in order to minimize ICI generated in a segment, an ICI cancellation technique may be used. For example, interference may be reduced by using a method combining OFDM and CDMA in the boundary between adjacent cells.

Or, in order to minimize ICI generated in a segment, a power control technique may be used. For example, power controlling is performed by using an overload indicator in uplink, and power allocation is performed based on a channel status feedback of a UE in downlink, thereby mitigating ICI.

Or, in order to minimize ICI generated in a segment, a cooperative beamforming technique may be used. For example, a BS may determine a PMI causing ICI as weak as possible with respect to an allocated resource block and perform beamforming.

Hereinafter, the case of using the cooperative beamforming technique between BSs in order to minimize ICI generated as the plurality of BSs transmit a signal in the same segment will be taken as an example in order to facilitate explanation. However, the cooperative beamforming technique is used only to explain an embodiment of the present invention and the technical concept of the present invention is not limited thereto. For example, in the present invention, every applicable ICI mitigation technique may be used in case in which a plurality of signals are transmitted on the same resource block, such as an ICI cancelation technique, an ICI randomization technique, a power controlling technique, and the like.

In determining the PMI applied to the resource block allocated to the segment 37a, the BS eNB1 determines a PMI such that weak ICI is generated to the backhaul signal transmitted by the BS eNB2 to the RN by using the resource block allocated to the segment 33. Similarly, in determining a PMI applied to the resource block allocated to the segment 37b, the BS eNB2 determines a PMI such that weak ICI is generated to the backhaul signal transmitted by the BS eNB1 to the RN by using the resource block allocated to the segment 31.

In order for the BS eNB1 and the BS eNB2 to make such a determination, the RN reports a PMI causing weak ICI to the two BSs eNB1 and eNB2. For example, when the RN detects that the BS eNB1 transmits a signal in the segment used for a backhaul data transmission with the BS eNB2 or when the RN is notified by the BS eNB1 or a different BS that there will be such a transmission in advance, the RN may report a PMI causing weak ICI to the BS eNB1. In this case, such a report may be directly transferred from the RN to the respective BSs, or may be transferred to different BSs participating in the cooperative transmission by way of any BS.

Meanwhile, the respective BS eNB1 and BS eNB2 may transmit data to a different RN or macro UEs thereof by using a frequency band or a resource block 39, which are not used by both of the two BSs eNB1 and eNB2.

In the data transmission method in a relay communication system according to another embodiment of the present invention as described above, since resource blocks allocated to a backhaul link segment of a different BS are used for a signal transmission on the assumption that the PMI, or the like, is appropriately determined, ICI can be maintained to have an appropriate level and the overall resource usability can be improved.

The data transmission method in a relay communication system according to another embodiment of the present invention as described above is particularly suitable for a case in which the number of antennas of BSs is relatively large because the transmission beamforming technique is to be applied to two BSs.

Figure 5:
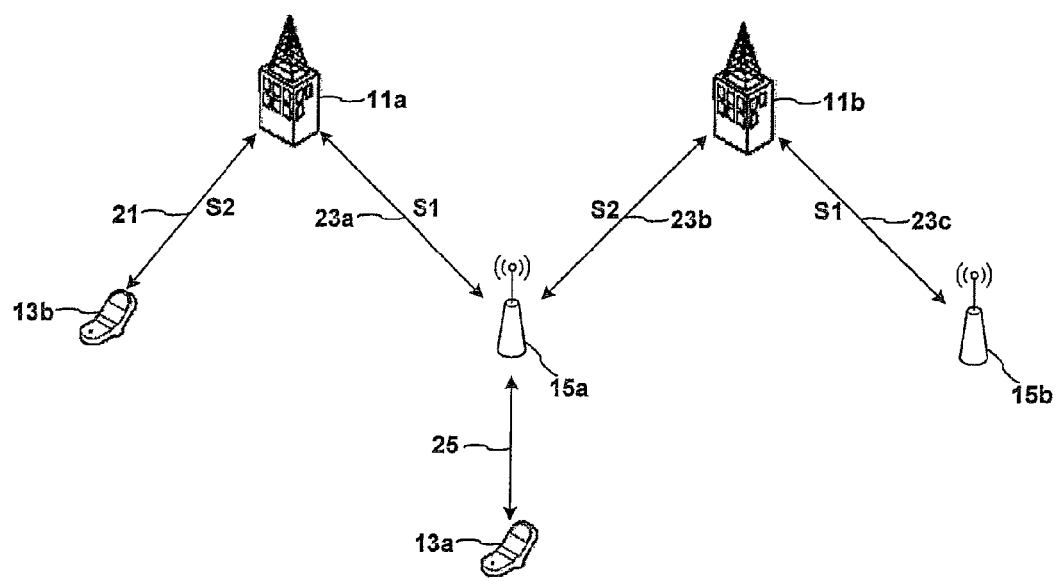
FIG. 5 is a conceptual view explaining the data transmission method in the relay communication system according to another embodiment of the present invention.

FIG. 5 is a conceptual view explaining the data transmission method in the relay communication system according to another embodiment of the present invention. Hereinafter, a segment may also be called a frequency band or resource blocks.

As shown in FIG. 5, the backhaul link 23a between the BS 11a and the RN 15 is set to be segment 1, while the backhaul link 23b between the BS 11b and the RN 15 is set to be segment 2, so the transmission of backhaul data between the respective BSs 11a and 11b and the RN 15 is made on different segments. Te RN 15 receives backhaul data from the two BSs 11a and 11b, and transfers the received backhaul data to the UE 13 through an access line 25. As described above with reference to FIG. 2, it is not required for the BS 11a and the BS 11b to share the backhaul data.

Also, the BS 11a may transmit and receive data to and from a macro UE 13b through an access link 21 established as a segment 2. Or, the BS 21 may transmit and receive data to and from a different relay node (RN) 15b through a backhaul link 23c established as a segment 1. Here, in order to minimize ICI generated from the plurality of signal transmission on the segment S1 or the segment S2, beamforming setting transmitted by the BS 11a to the macro UE 13b and beamforming setting transmitted by the BS 11b to the different RN 15b are controlled to follow a PMI setting which can minimize ICI. For example, when the RN 15a detects that the BS 11b transmits a signal on the segment S1, the RN 15a may determine an appropriate PMI and report the same to the BS 11b. Or, when the RN 15a detects that the BS 11a transmits a signal on the segment S2, the RN 15a may determine an appropriate PMI and report the same to the BS 11b.

Meanwhile, a method for transmitting scheduling information required for detecting and decoding backhaul data signals transmitted from the two BSs 11a and 11b can be understood to be the same as or similar to that described above with reference to FIG. 3, so a description thereof will be omitted.

Figure 6:
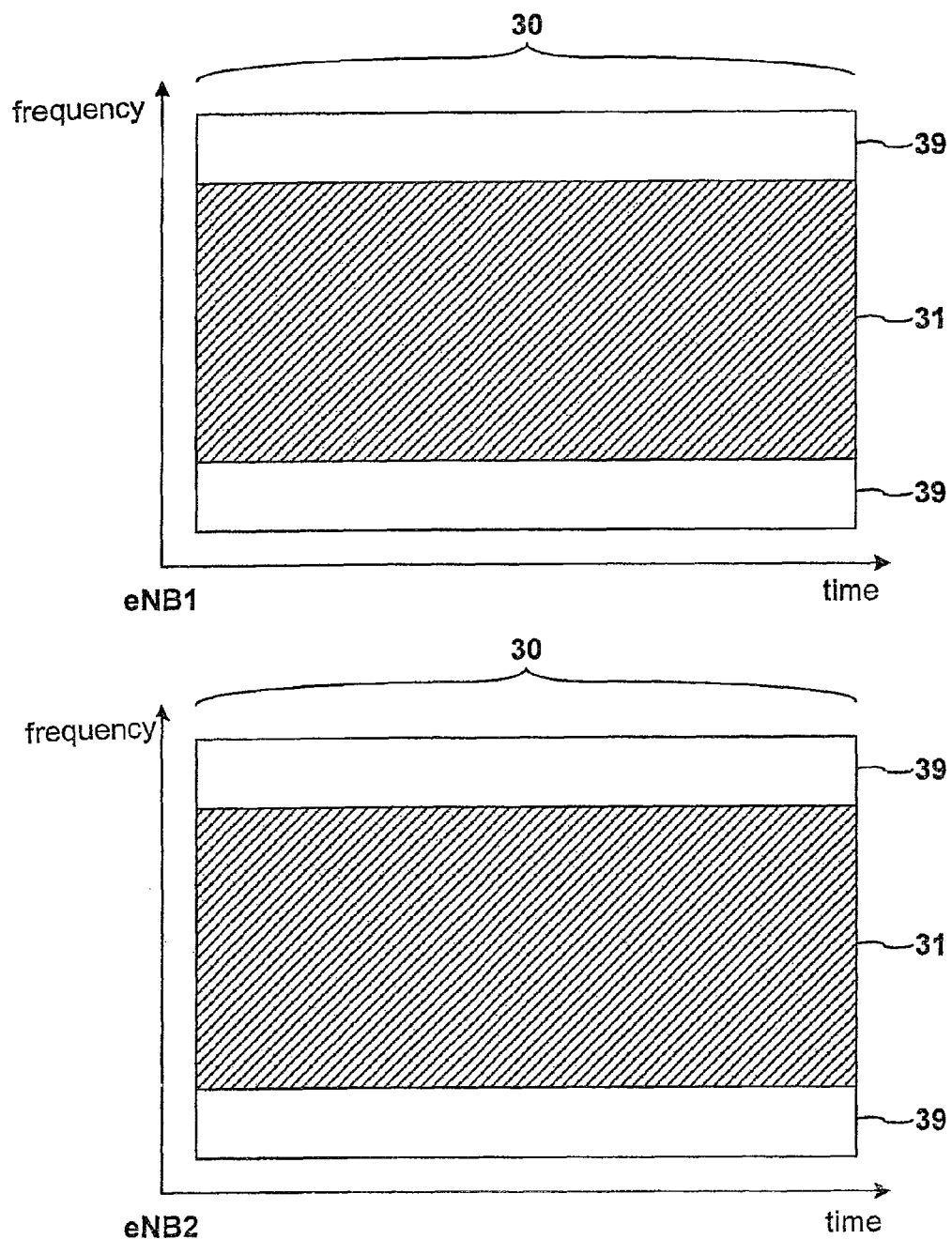
FIG. 6 is a conceptual view showing the structure of a subframe used in a data transmission method in the relay communication system according to another embodiment of the present invention.

FIG. 6 is a conceptual view showing the structure of a subframe used in a data transmission method in the relay communication system according to another embodiment of the present invention.

The embodiment of the present invention illustrated in FIG. 2 and the embodiment of the present invention illustrated in FIG. 6 are compared as follows. Namely, in the embodiment of the present invention illustrated in FIG. 2, the respective BSs transmit a backhaul data signal in the different segments 35a and 35b to the RN, while in the embodiment of the present invention illustrated in FIG. 6, the respective BSs may transmit a backhaul data signal in the same segments 31 to the RN.

Namely, the embodiment of the present invention illustrated in FIG. 2 is different from the embodiment of the present invention illustrated in FIG. 6 in that, for example, the BS eNB1 does not transmit a signal in the segment 35a corresponding to the segment 33 used by the BS eNB2 for a backhaul ink, thereby fundamentally preventing mutual signal interference, while in the embodiment of the present invention illustrated in FIG. 6, for example, the BS eNB1 may transmit backhaul data, to the RN, in the same segment 31 which is used by the BS eNB2 for a backhaul link with the relay node.

Meanwhile, the respective BSs eNB1 and eNB2 may transmit data to a different relay node or macro UEs thereof by using a frequency band or the resource block 39 which is not used by both of the BSs eNB1 and eNB2.

In the data transmission method in the relay communication system according to another embodiment of the present invention as described above, the plurality of BSs transmit backhaul data to the relay node by using the same resource blocks of the same subframe, and this means that the JP technique, among the cooperative transmission schemes, is used. Thus, the data transmission method in the relay communication system according to another embodiment of the present invention can obtain a high SINR (signal to interference plus noise ratio) by a signal combining effect of the JP technique.

The data transmission method in the relay communication system according to another embodiment of the present invention is particularly suitable for a case in which the number of antennas of the BSs is relatively large, because the plurality of BSs are required to perform a high-rank transmission and the RN is required to perform a high-rank reception according to the use of the JP technique.

Figure 7:
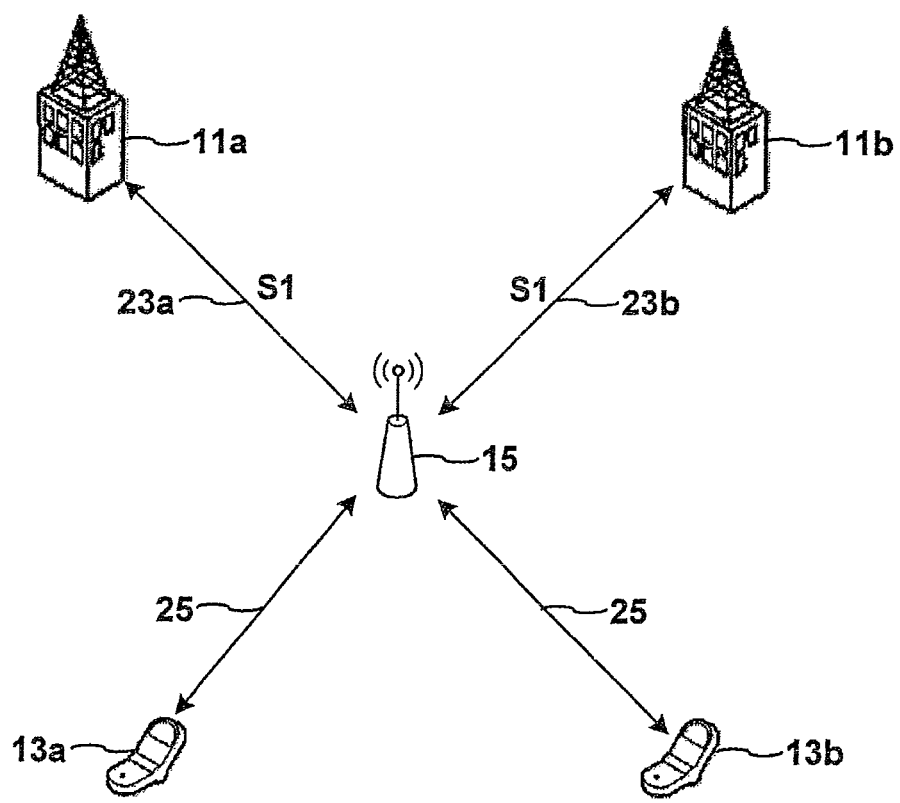
FIG. 7 is a conceptual view explaining the data transmission method in the relay communication system according to another embodiment of the present invention.

FIG. 7 is a conceptual view explaining the data transmission method in the relay communication system according to another embodiment of the present invention. Hereinafter, the segment may be called a frequency band or resource blocks.

As shown in FIG. 7, the backhaul link 23a between the BS 11a and an RN 15 is established as a segment S1, and the backhaul link 23b between the BS 11b and the relay node 15 is also established as the segment S1, so a backhaul data transmission between the respective BSs 11a and 11b and the RN 15 is performed on the same segment. The RN 15 receives backhaul data from the two BSs 11a and 11b and transfers the received backhaul data to two UEs 13a and 13b through access links 25.

In the data transmission method (referred to as a 'first method', hereinafter) in the relay communication system according to an embodiment of the present invention described above with reference to FIG. 3 and in the data transmission method (referred to as a 'second method', hereinafter) in the relay communication system according to an embodiment of the present invention described above with reference to FIG. 5, the operation is performed without sharing backhaul data between the BSs 11a and 11b. In comparison, in the data transmission method (referred to as a 'third method', hereinafter) in the relay communication system according to an embodiment of the present invention described above with reference to FIG. 7, the BSs 11a and 11b participating in a cooperative transmission are required to share backhaul data.

In the following description, the first to third methods will be compared by using a case in which the BS 11*a* transmits data D1 to the UE 13*a* and the BS 11*b* transmits data D2 to the UE 13*b*.

In the first and second methods, the data D1 to the UE 13*a* and the data D2 to the UE 13*b* are transferred from the BSs 11*a* and 11*b* to the relay node (RN) 15, and then transferred to the UEs 13*a* and 13*b*, respectively. Data transmission from the UEs 13*a* and 13*b* to the BSs 11*a* and 11*b* can be understood in the same manner. Thus, data sharing is not required from a point of view of the respective UEs and the respective BSs.

However, in the third method, for a JP transmission, the data D1 to the UE 13*a* and the data D2 to the UE 13*b* are shared by the BSs 11*a* and 11*b*, and the same data fragments constituting the data D1 or the data D2 are transferred from the BS 11*a* and the BS 11*b* to the RN 15 and then transferred to the UE 13*a* or 13*b*, a corresponding destination of the data fragments. Data transmission from the UEs 13*a* and 13*b* to the BSs 11*a* and 11*b* can be understood in the same manner. Thus, data sharing is required from a point of view of the respective UEs or the respective BSs.

Figure 8:
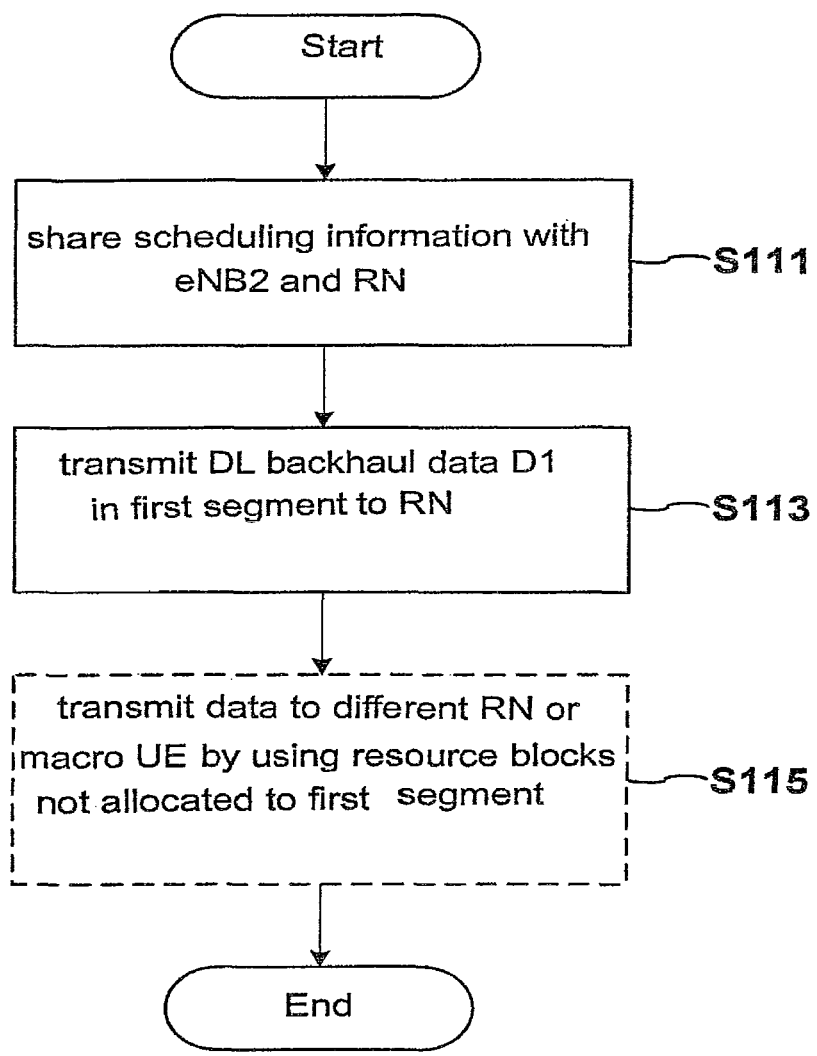
FIGS. 8 and 9 are flow charts illustrating the process of a data transmission method in a relay communication system according to an embodiment of the present invention.
Figure 9:
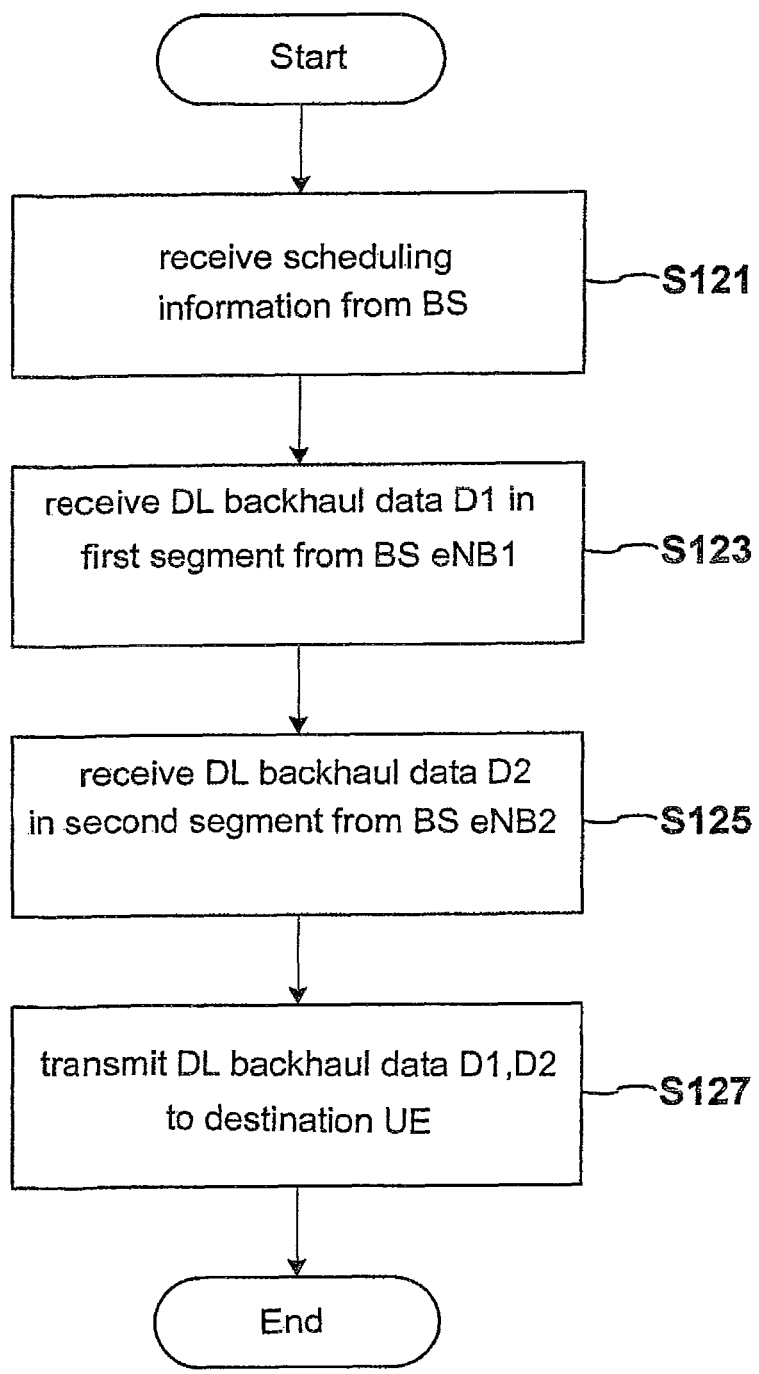

FIGS. 8 and 9 are flow charts illustrating the process of a data transmission method in a relay communication system according to an embodiment of the present invention. Hereinafter, a segment may be called a frequency band or resource blocks. Also, in the following description, it is assumed that, in a downlink backhaul data transmission, a transmitter is a BS and a receiver is a RN, the BS eNB1 transmits backhaul data in a first segment to the RN, the BS eNB2 transmits backhaul data in a second segment to the RN, the BS eNB1 does not transmit a signal in the second segment, and the eNB2 does not transmit a signal in the first segment, for the sake of brevity.

With reference to FIG. 8, first, the BS eNB1 shares scheduling information with the BS eNB2 and the RN through a means such as a message, a backbone interface, an X2 interface, or the like (step S111). Here, as mentioned above, the scheduling information may include an RN ID used for each segment, the positions and number of allocated resource blocks, MCS, PMI, and the like.

Next, the BS eNB1 transmits the downlink backhaul data D1 in the first segment to the RN (step S113).

Also, selectively, the BS eNB1 may transmit data to a different RN or a macro UE by using resource blocks which have not been allocated to the first segment (step S115). Here, however, the BS eNB1 does not transmit data in the second segment. The operation of the BS eNB2 may be understood to be similar to that of the BS eNB1.

Meanwhile, with reference to FIG. 9, the RN may receive the scheduling information from the BS eNB1 or the BS eNB2 through a means such as a message, a backbone interface, an X2 interface, or the like (step S121). Thereafter, the RN receives the downlink backhaul data D1 in the first segment from the BS eNB1 (step S123). And then, the RN receives the downlink backhaul data D2 in the second segment from the BS eNB2 (step S125). And then, the RN transmits the downlink backhaul data D1 and D2 to a destination UE (step S127). Here, the downlink backhaul data D1 and D2 are transmitted to the same UE or to different UEs.

Figure 10:
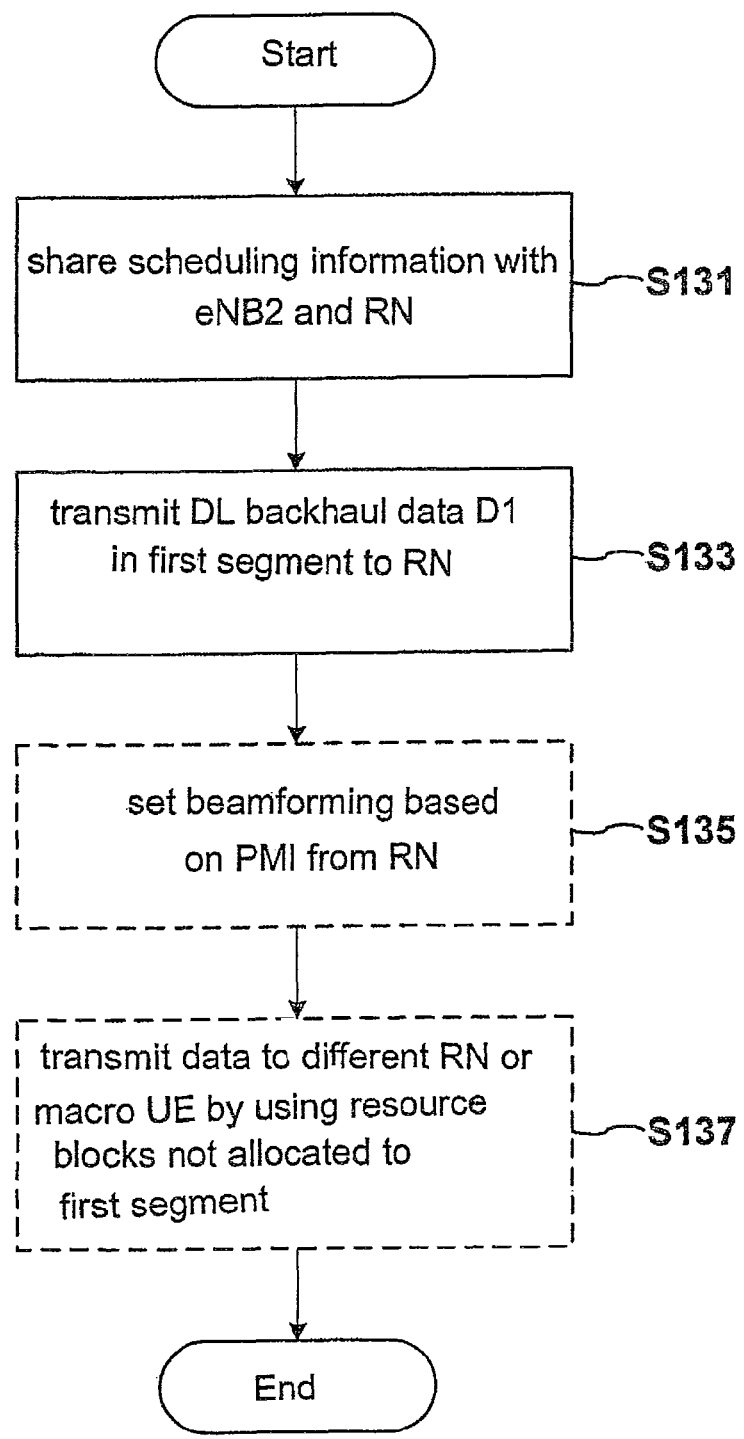
FIGS. 10 and 11 are flow charts illustrating the process of a data transmission method in a relay communication system according to another embodiment of the present invention.
Figure 11:
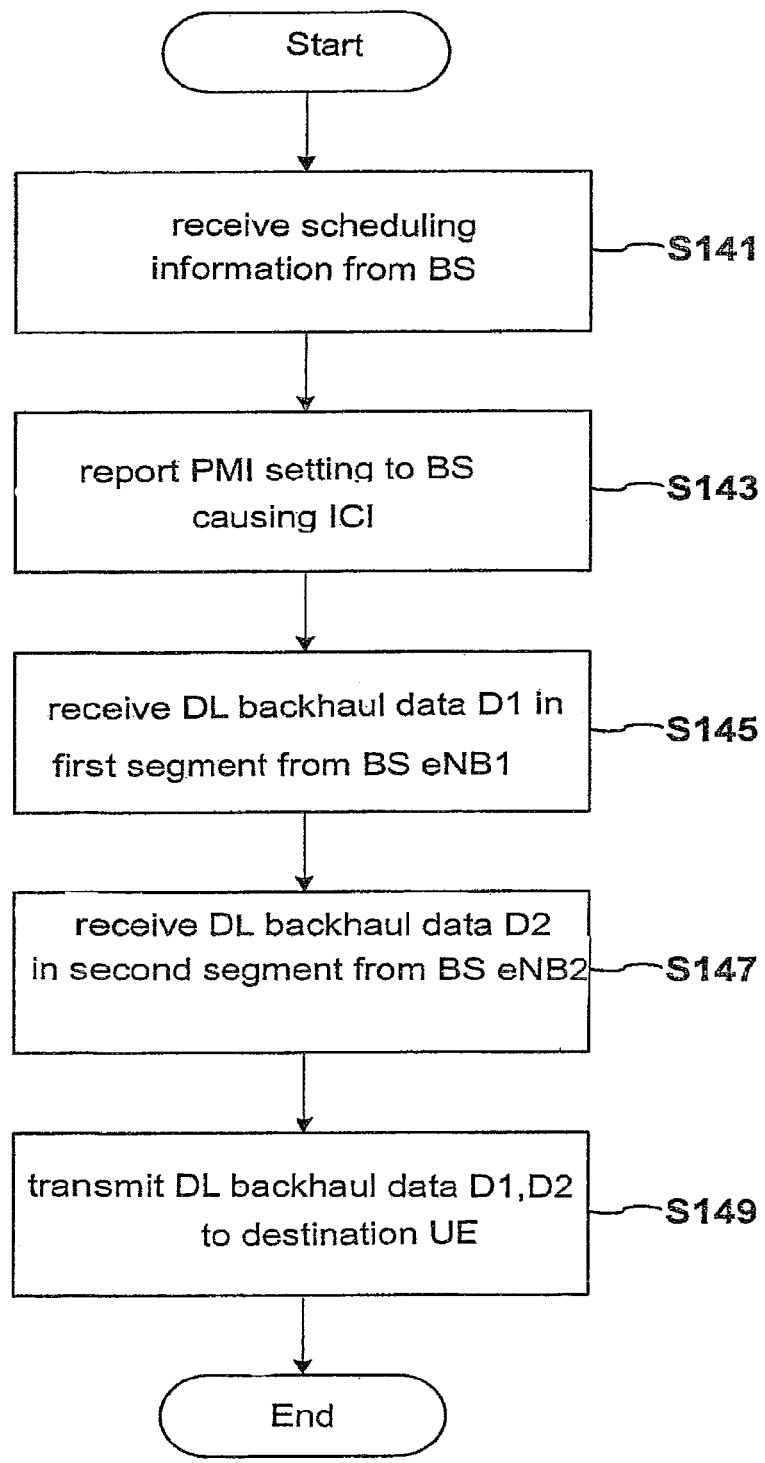

FIGS. 10 and 11 are flow charts illustrating the process of a data transmission method in a relay communication system according to another embodiment of the present invention. Hereinafter, a segment may be called a frequency band or resource blocks. Also, in the following description, it is assumed that, in a downlink backhaul data transmission, a transmitter is a BS and a receiver is a RN, the BS eNB1 transmits backhaul data in a first segment to the RN, the BS eNB2 transmits backhaul data in a second segment to the RN, and the cooperative beamforming technique is used as an ICI mitigation method in the case in which the BSs transmit signals in the same segment.

With reference to FIG. 10, first, the BS eNB1 shares scheduling information with the BS eNB2 and the RN through a means such as a message, a backbone interface, an X2 interface, or the like (step S131). Next, the BS eNB1 transmits the downlink backhaul data D1 in the first segment to the RN (step S133).

Also, selectively, the BS eNB1 may transmit data to a different RN or a macro UE by using resource blocks which have not been allocated to the first segment (step S137). In particular, the BS eNB1 may transmit data in the second segment. Here, in order to minimize ICI which may be generated to the signal transmission in the second segment of the BS eNB2, the BS eNB1 may be apprised of a PMI for minimizing ICI from the RN, and set beamforming based on the PMI (step S135). According to the set beamforming, the BS eNB1 transmits data to a different RN or a macro UE in the second segment (step S137). The operation of the BS eNB2 may be understood to be similar to that of the BS eNB1.

Meanwhile, with reference to FIG. 11, the RN may receive the scheduling information from the BS eNB1 or the BS eNB2 through a means such as a message, a backbone interface, an X2 interface, or the like (step S141).

When the RN knows that the BS eNB1 and the BS eNB2 will transmit a signal in the same segment or when the RN detects that a different BS transmits a signal in the same segment while one BS is receiving backhaul data, the RN may report a PMI setting which can minimize ICI to the BS causing ICI (step S143).

Thereafter, the RN receives the downlink backhaul data D1 in the first segment from the BS eNB1 (step S145). And then, the RN receives the downlink backhaul data D2 in the second segment from the BS eNB2 (step S147). And then, the RN transmits the downlink backhaul data D1 and D2 to a destination UE (step S149). Here, the downlink backhaul data D1 and D2 are transmitted to the same UE or to different UEs.

Figure 12:
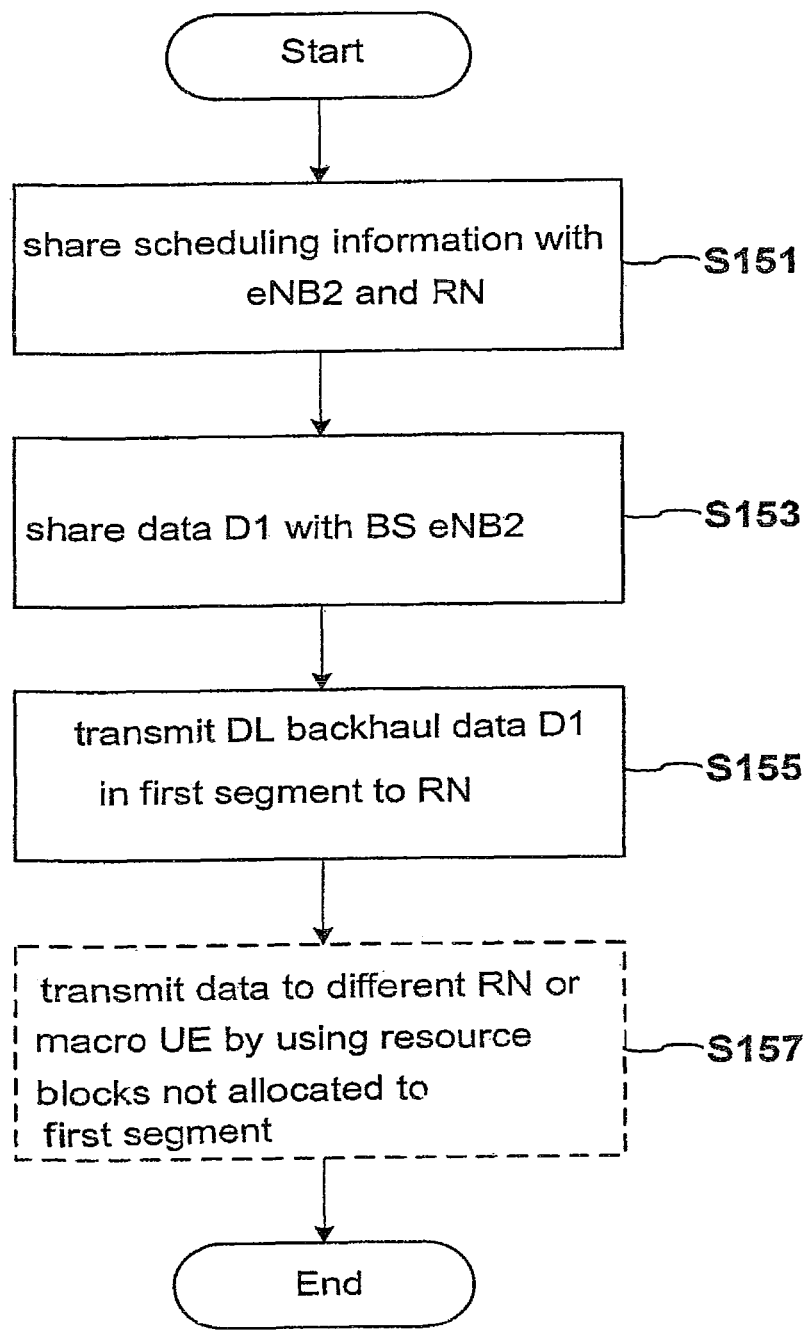
FIGS. 12 and 13 are flow charts illustrating the process of a data transmission method in a relay communication system according to another embodiment of the present invention.
Figure 13:
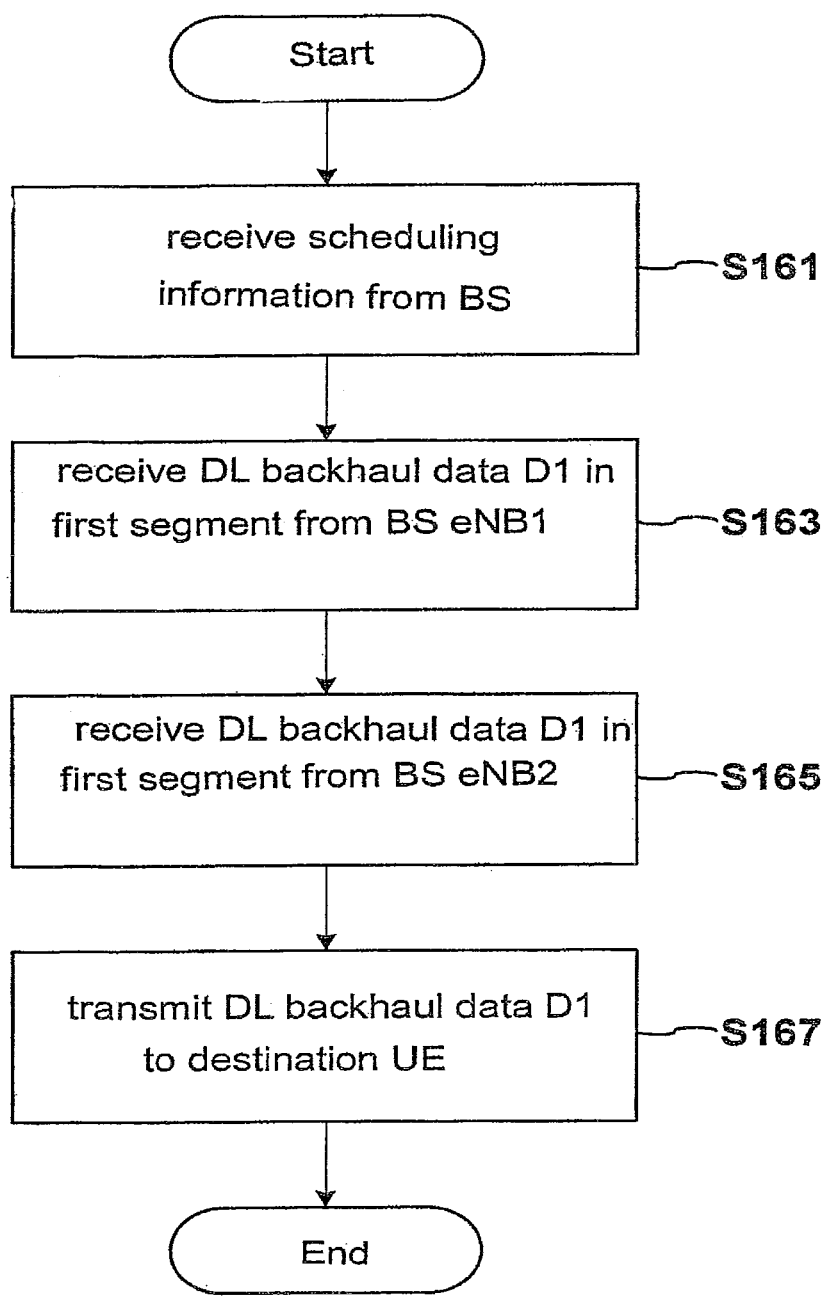

FIGS. 12 and 13 are flow charts illustrating the process of a data transmission method in a relay communication system according to another embodiment of the present invention.

Hereinafter, a segment may be called a frequency band or resource blocks. Also, in the following description, it is assumed that, in a downlink backhaul data transmission, a transmitter is a BS and a receiver is a RN, the BS eNB1 transmits backhaul data in a first segment to the RN, and the BS eNB2 transmits backhaul data in the same first segment to the RN.

With reference to FIG. 12, first, the BS eNB1 shares scheduling information with the BS eNB2 and the RN through a means such as a message, a backbone interface, an X2 interface, or the like (step S151). Next, the BS eNB1 shares data D1 with the BS eNB2 through a backbone interface, an X2 interface, or the like (step S153).

Thereafter, the BS eNB1 transmits downlink backhaul data D1 in the first segment to the RN (step S155). Here, it is characterized in that the BS eNB2 transmits the downlink backhaul data D1, which is the same as the data transmitted by the BS eNB1, in the same first segment as that used by the BS eNB1 to the RN.

Also, selectively, the BS eNB1 may transmit data to a different RN or a macro UE by using resource blocks which have not been allocated to the first is segment (step S157). The operation of the BS eNB2 may be understood to be similar to that of the BS eNB1.

Meanwhile, with reference to FIG. 13, the RN may receive the scheduling information from the BS eNB1 or the BS eNB2 through a means such as a message, a backbone interface, an X2 interface, or the like (step S161). Thereafter, the RN receives the downlink backhaul data D1 in the first segment from the BS eNB1 (step S163). And then, the RN receives the same downlink backhaul data in the same first segment from the BS eNB2 (step S165). And then, the RN transmits the downlink backhaul data D1 to a destination UE (step S167).

Figure 14:
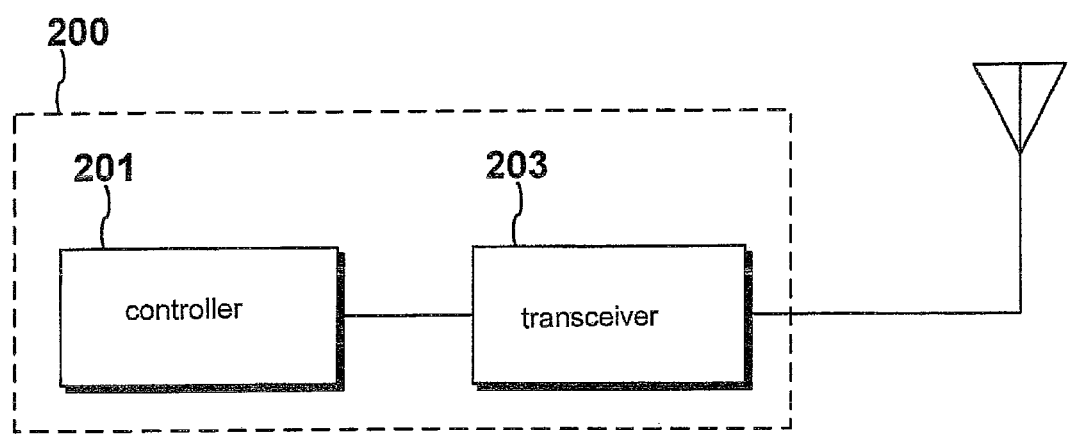
FIG. 14 is a schematic block diagram of a data transmission apparatus in a relay communication system according to an embodiment of the present invention.

FIG. 14 is a schematic block diagram of a data transmission apparatus in a relay communication system according to an embodiment of the present invention.

A data transmission apparatus 200 according to an embodiment of the present invention includes a controller 201 and a transceiver 203. The data transmission apparatus 200 according to an embodiment of the present invention may be a BS or an RN. Hereinafter, for the sake of brevity, a case of a downlink backhaul data transmission in which the data transmission apparatus 200 according to an embodiment of the present invention is a BS, a transmitter is a BS, and a receiver is an RN will be described as an example. Hereinafter, a segment may also be called a frequency band or resource blocks.

The controller 201 transmits a control signal for controlling a general operation of the transceiver 203.

The transceiver 203 exchanges scheduling information with the BS eNB2 and the RN through a means such as a message, a backbone interface, an X2 interface, or the like. Here, the scheduling information may include an RN ID used for each segment, the positions and number of allocated resource blocks, MCS, PMI, and the like.

The transceiver 203 transmits the downlink backhaul data D1 in the first segment to the RN. The transceiver 203 may transmit data to a different RN or macro UE by using resource blocks which have not been allocated to the first segment. In this case, the transceiver 203 may not transmit data in the second segment in which a different BS transmits backhaul data, or may transmit data in the second segment.

When the transceiver 203 transmits data in the second segment, in order to minimize ICI which may be generated when a different BS transmits a signal in the second segment, the controller 201 may be apprised of the PMI capable of minimizing ICI from the RN through the transceiver 203 and set beamforming based on the PMI. The transceiver 203 may perform MIMO data transmission according to the beamforming set by the controller 201.

Meanwhile, the transceiver 203 may share backhaul data with a different BS by exchanging the backhaul data through a backbone interface, an X2 interface, or the like. Here, the transceiver 203 transmits the downlink backhaul data in the first segment to the RN, and the different BS may also transmit the same data which was previously shared in the first segment, as the downlink backhaul data to the RN.

The controller 201 and the transceiver 203 when the data transmission apparatus 200 according to an embodiment of the present invention is an RN can be understood in the similar manner at that of the data transmission method according to an embodiment of the present invention as described above with reference to FIGS. 9, 11, and 13, so a description thereof will be omitted.

The data transmission apparatus according to an embodiment of the present invention may include hardware, software, a recording medium, an output device (e.g., a display device, a speaker, etc.), an input device (a touch screen, a keypad, a microphone, etc.), a memory, and a processor, besides the foregoing elements. Such constituents are obvious to a person skilled in the art, so a detailed description thereof will be omitted.

The data transmission apparatus according to an embodiment of the present invention may be implemented by hardware, software, a computer-readable recording medium, or a combination thereof. For hardware implementation, the data transmission apparatus according to an embodiment of the present invention described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units, or a combination thereof. For software implementation, the data transmission apparatus according to an embodiment of the present invention may be implemented by at least one software module performing the foregoing functions or operations. Each software module may be implemented by software codes written in any suitable programming language. The software codes may be stored in a memory and executed by a processor. As the memory or the process, various means well known to a person skilled in the art may be employed.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A data transmission method of a base station (BS) in a radio relay communication system, the method comprising:

obtaining, by a first BS, radio resource information scheduled by a neighbor BS with respect to a first relay node (RN) located within an overlapping cell coverage between the first BS and the neighbor BS;

receiving, by the first BS, information regarding inter-cell interference (ICI) generated as the first BS transmits backhaul data to a second RN or a macro user equipment (UE), from the first RN, wherein the received information regarding the ICI includes a frequency reuse factor (FRF) and a precoding matrix index (PMI) related to the ICI;

when the first BS has backhaul data to be transmitted to the first RN, scheduling the backhaul data of the first BS on a radio resource allocated by the neighbor BS;

when the first BS has backhaul data to be transmitted to the second RN or the macro UE, scheduling, by the first BS, the backhaul data of the first BS on the radio resource which has been allocated by the neighbor BS;

adjusting, by the first BS, a setting of beamforming for backhaul data transmission to the second RN or the macro UE such that ICI with respect to the first RN is minimized based on the received information regarding the ICI; and transmitting, by the first BS, the backhaul data of the first BS on the radio resource according to a frequency reuse factor (FRF), wherein the radio resource is resource blocks, and the resource blocks are divided into a subframe and a frequency band, wherein the FRF is set to use 1 in a central area of a cell and is set to use greater than 1 in a cell boundary area, and wherein a backhaul link, through which the backhaul data is transmitted, includes a relay physical downlink shared channel (R-PDSCH) and a relay physical downlink channel (R-PDCCH).

2. The method of claim 1, wherein the backhaul data transmitted by the first BS to the first RN and the backhaul data transmitted by the neighbor BS to the first RN do not have a common part.

3. The method of claim 1, wherein the backhaul data transmitted by the first BS to the first RN and the backhaul data transmitted by the neighbor BS to the first RN are backhaul data toward different UEs, respectively.

4. A first backhaul data transmission apparatus in a radio relay communication system, the first backhaul data transmission apparatus comprising:

a controller configured to schedule backhaul data, to be transmitted to a relay node (RN), on a radio resource allocated by a neighbor backhaul data transmission apparatus when the backhaul data is to be transmitted to the RN; and a transceiver configured to obtain radio resource information scheduled by the neighbor backhaul data transmission apparatus with respect to the RN, and to receive information regarding inter-cell interference (ICI) generated, from the RN, wherein the received information regarding the ICI includes a frequency reuse factor (FRF) and a precoding matrix index (PMI) related to the ICI, and to transmit the backhaul data on the radio resource according to the FRF, wherein the RN is located within an overlapping cell coverage between the first backhaul data transmission apparatus and the neighbor backhaul data transmission apparatus, wherein the first backhaul data transmission apparatus is a first base station (BS) and the neighbor backhaul data transmission apparatus is a neighbor BS, wherein the controller is further configured to adjust a setting of beamforming for backhaul data transmission such that ICI with respect to the RN is minimized based on the received information regarding the ICI, and wherein the FRF is set to use 1 in a central area of a cell and is set to use greater than 1 in a cell boundary area, and wherein a backhaul link, through which the backhaul data is transmitted, includes a relay physical downlink shared channel (R-PDSCH) and a relay physical downlink control channel (R-PDCCH).

* * * * *